July 19, 1960
E. W. HAWKINSON
2,945,534
TIRE BUFFING MACHINE
Filed Feb. 13, 1959
3 Sheets-Sheet 1
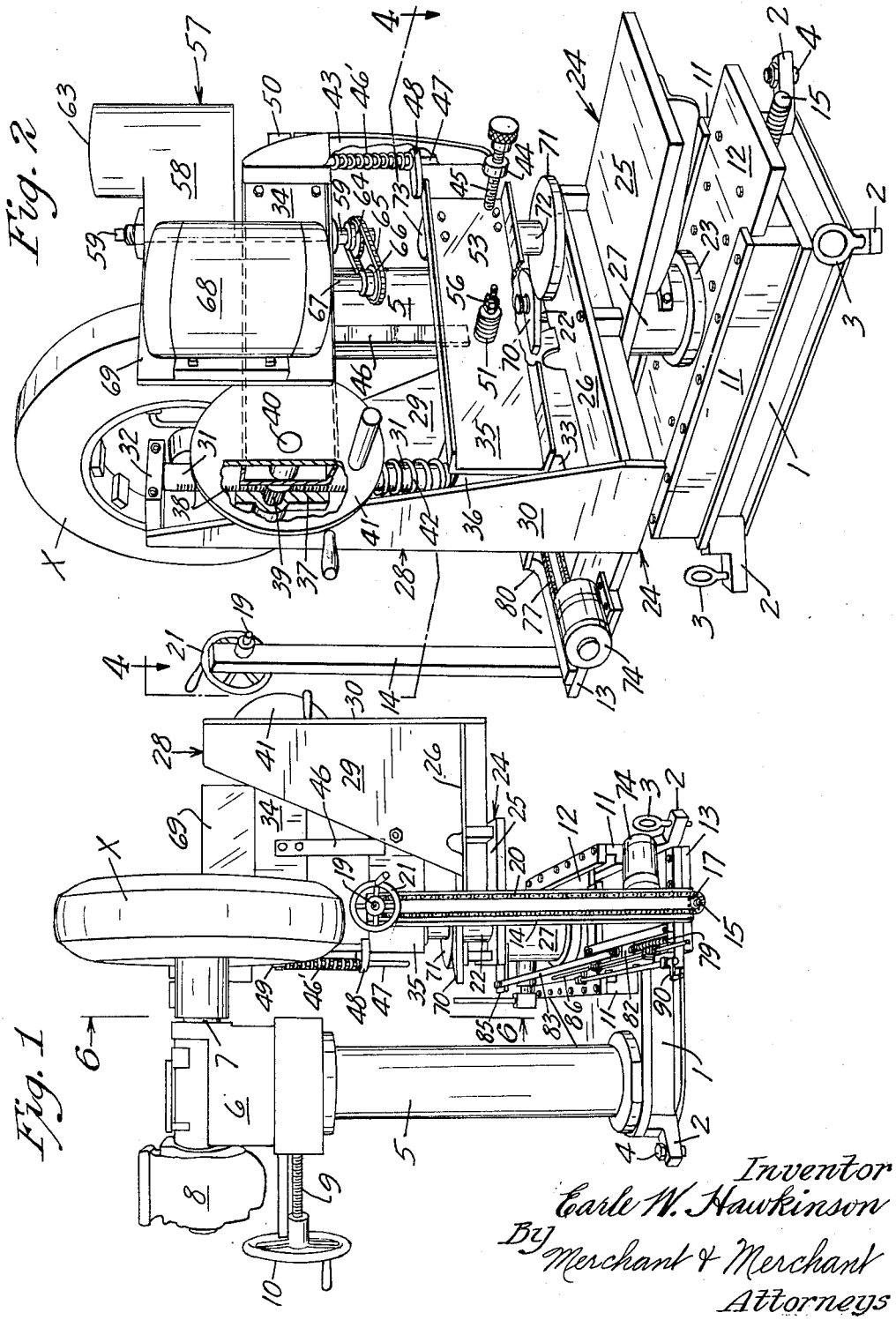
Inventor
Earle W. Hawkinson
By Merchant & Merchant
Attorneys July 19, 1960
E. W. HAWKINSON
2,945,534
TIRE BUFFING MACHINE
Filed Feb. 13, 1959
3 Sheets-Sheet 2
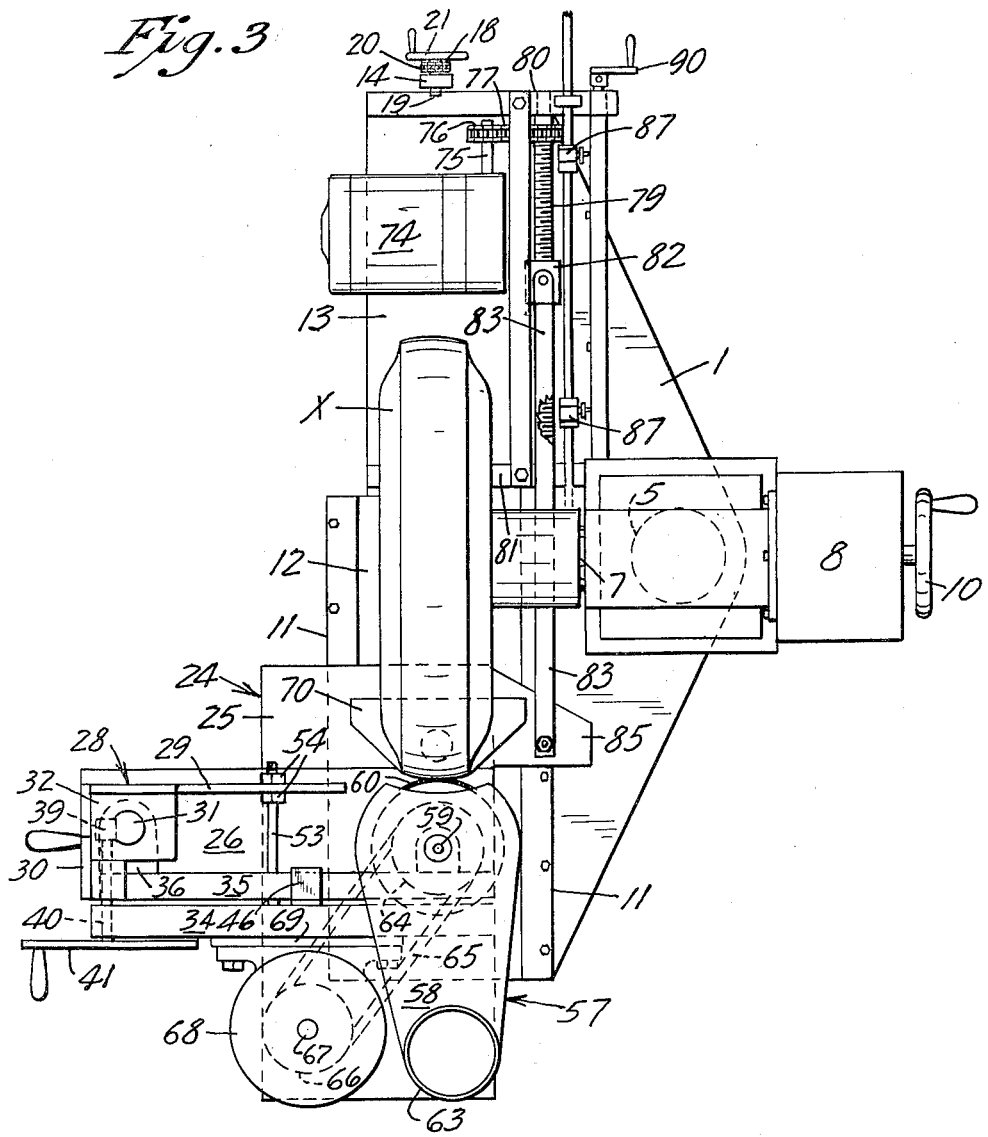
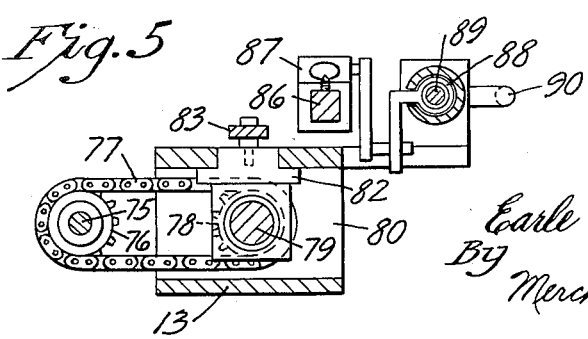
Inventor
Earle W. Hawkinson
By Merchant & Merchant
Attorneys July 19, 1960     E. W. HAWKINSON     2,945,534
TIRE BUFFING MACHINE
Filed Feb. 13, 1959     3 Sheets-Sheet 3
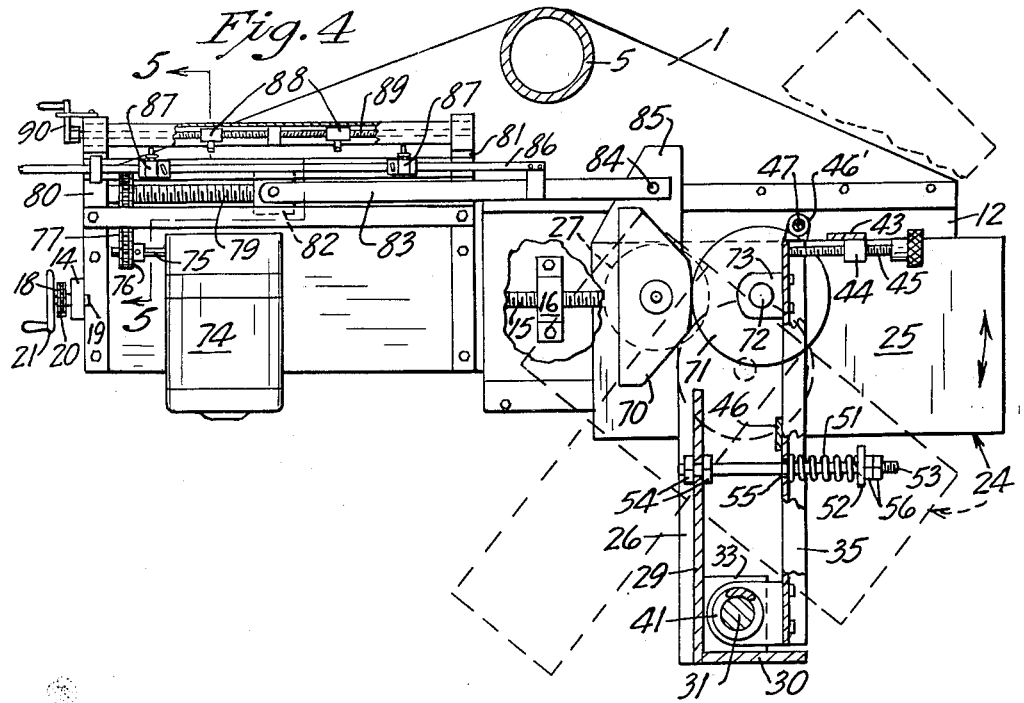
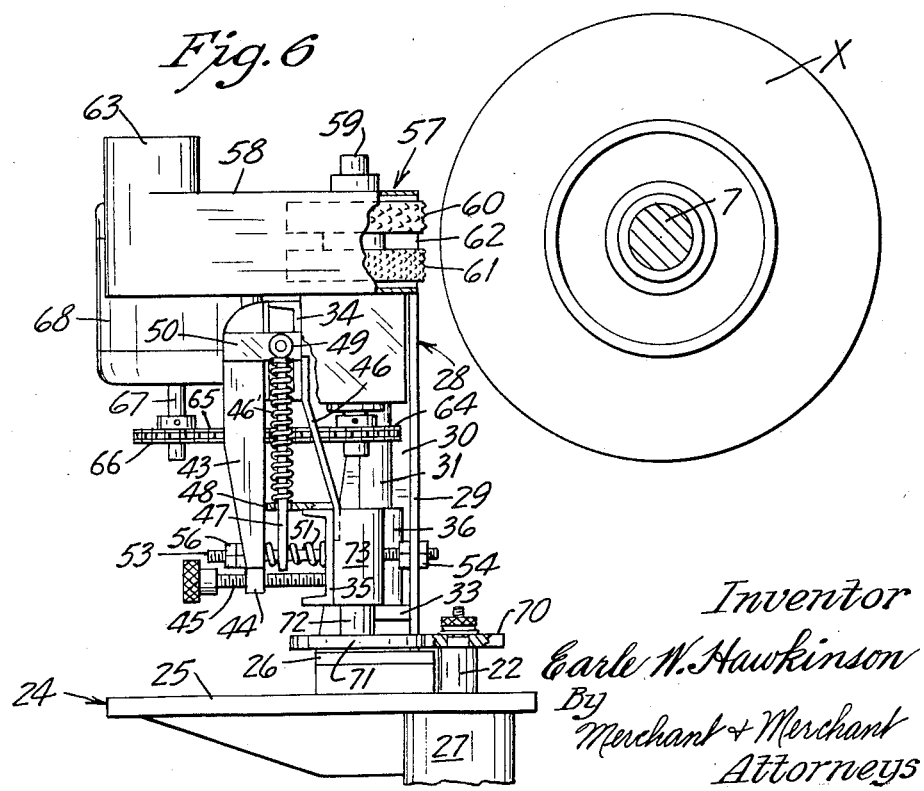
Inventor
Earle W. Hawkinson
By Merchant & Merchant
Attorneys 2,945,534

TIRE BUFFING MACHINE

Earle W. Hawkinson, Minneapolis, Minn., assignor to Paul E. Hawkinson Company, Minneapolis, Minn., a corporation of Minnesota Filed Feb. 13, 1959, Ser. No. 793,157

5 Claims. (Cl. 157—13)

My invention relates generally to tire buffing machines, and more particularly to improvements in such machines utilized to buff or finish the road-engaging crown portions and adjacent shoulder portions of tires in connection with a retreading operation.

Tire buffing and truing machines heretofore used have employed means for mounting a tire for rotation on its own axis, and one or more buffing wheels or rotary rasps disposed to rotate on an axis generally parallel to the axis of the tire. Generally in the operation of these machines, the road-engaging crown surface of the tire is buffed or abraded to the desired extent, after which the relative positions of the tire and buffing wheel are shifted so that the side wall surfaces or shoulders of the tire adjacent the road-engaging crown surface thereof, are buffed or abraded.

An important object of my invention is the provision of a tire buffing machine having a rotary buffing wheel which rotates on an axis that extends in a direction normal to the direction of the axis of the tire to be buffed, and of novel means for shifting the buffing wheel during operation thereof in such a manner that the road-engaging crown surface of the tire and the adjacent shoulders or side walls surface portions are buffed in one continuous operation.

Another important object of my invention is the provision of a machine as set forth having a plurality of buffing wheels mounted on a common shaft, and of novel means for axially shifting said buffing wheels to selectively position a desired one thereof in proper relationship with the tire to be buffed.

Another object of my invention is the provision of a buffing machine as set forth, which may be quickly and easily adjusted to accommodate tires of various diameters and cross sectional sizes.

Another object of my invention is the provision of a machine of the above type, the operation of which is substantially automatic.

The above, and still further highly important objects and advantages of my invention, will become apparent from the following detailed specification, appended claims and attached drawings.

Referring to the drawings, which illustrate the invention, and in which like reference characters indicate like parts throughout the several views:

Fig. 1 is a view in perspective of a tire buffing machine made in accordance with my invention, as seen from one side thereof;

Fig. 2 is an enlarged view in perspective of the machine of Fig. 1 as seen from the opposite side and one end thereof, some parts being broken away and some parts being shown in section;

Fig. 3 is a view in top plan;

Fig. 4 is a view partly in top plan and partly in horizontal section, taken substantially on the line 4—4 of Fig. 2, some parts being broken away and some parts being shown in section;

Fig. 5 is an enlarged fragmentary section taken substantially on the line 5—5 of Fig. 4; and Fig. 6 is an enlarged fragmentary detail in elevation as seen from the line 6—6 of Fig. 1, some parts being broken away and some parts shown in section.

In the preferred embodiment of the invention illustrated, a base 1 is shown as being provided with a plurality of outwardly projecting feet 2 that are provided with the usual leveling screws or the like 3 and 4. A rigid upright column 5 extends upwardly from the base 1, at one side thereof, and which at its upper end carries an elongated bearing 6 which journals a rotary tire supporting shaft 7 on one end of which is suitably mounted a tire X to be buffed. Rotation is imparted to the tire supporting shaft 7 by an electric motor, not shown, through suitable transmission mechanism including conventional gearing contained within a housing 8. The bearing 6, together with the tire supporting shaft 7 and parts associated therewith are adjustable transversely of the column 5, such adjustment being made through an adjustment screw 9 and hand wheel 10 secured thereto. The details of construction of the tire supporting means above described do not in themselves comprise the instant invention. Hence, for the sake of brevity, detailed showing and description thereof is omitted, reference being had to my prior United States Letters Patent No. 2,787,089 for a detailed disclosure thereof.

Rigidly mounted on the base 1 is a pair of laterally spaced parallel guide rails 11 which mount and guide an elongated plate-like slide 12 for longitudinal sliding movements in opposite directions normal to the direction of the axis of the wheel supporting shaft 7 and in a horizontal plane well below the level of the tire X mounted on the supporting shaft 7. The slide 12 is formed to provide a longitudinally projected extension portion 13, to the outer end of which is secured an upstanding leg 14. The lower end of the leg 14 projects slightly below the slide extension 13 and forms a bearing for one end portion of a screw threaded shaft 15 which extends longitudinally between the guide rails 11, and which has screw threaded engagement with a nut element 16 bolted or otherwise rigidly secured to the base 1, see Fig. 4. Means for rotating the shaft in opposite directions to impart longitudinal sliding movements to the slide 12 and parts carried thereby, comprises a sprocket wheel 17 rigidly secured to the shaft 15 adjacent the lower end of the leg 14, a second sprocket 18 rigidly mounted on a shaft 19 that is journalled in the upper end portion of the leg 14, an endless link chain 20 entrained over the sprocket wheels 17 and 18, and a hand-wheel 21 rigidly mounted on one end of the shaft 19.

A vertically disposed pedestal or shaft 22 extends upwardly from the slide 12, and is provided at its lower end with a mounting flange 23 by means of which the shaft 22 is rigidly secured to the slide 12 in a suitable manner such as with bolts or the like, not shown. A frame, indicated generally at 24, comprises a pair of superposed horizontally disposed frame members 25 and 26 mounted on a sleeve 27 that is journalled on the shaft 22 for rotation thereon. The frame 24 further includes an angular member 28 secured at its lower end to the frame member 26 and which extends upwardly therefrom, said angular frame member 28 including side and end web elements 29 and 30 respectively. It will be noted that the frame member 26 extends laterally outwardly beyond one longitudinal edge of the underlying slide 12, the angular member 28 being disposed at the outer end portion of the frame member 26.

A vertically disposed shaft 31 is journalled in bearings 32 and 33 at the upper and lower end portions respectively of the web 29, said shaft 31 carrying a pair of vertically spaced arms 34 and 35. Said arms 34 and 35 are horizontally disposed and extend generally in the direction of the frame member 26, the outer end of the lower arm 35 being provided with a bearing 36 whereby said lower arm 35 is journalled on the shaft 31. The outer end of the upper arm 34 is likewise provided with a bearing 37 which mounts said upper arm 34 to the shaft 31 for vertical sliding movements with respect to the shaft 31. The shaft 31 is formed to provide a gear rack, indicated at 38, that is engaged by a pinion 39 formed in a pinion shaft 40 that is journalled in the bearing 37, and to the outer end of which is rigidly mounted an adjusting hand wheel 41. Engagement of the teeth of the pinion 39 with the teeth of the rack 38 effectively prevents rotation of the upper arm 34 with respect to the shaft 31. Preferably, the bearing 36 of the lower arm 35 rests upon the lower bearing 33, and a counter-balancing spring 42 is interposed between the bearing 36 of the lower arm 35 and the bearing 37 of the upper arm 34, see particularly Fig. 2.

Welded or otherwise rigidly secured to the free end portion of the upper arm 34 is a depending leg 43 having a screw threaded boss 44 at its lower end. An adjustment screw 45 is screw threadedly received in the boss 44, the inner end of the screw 45 being adapted to have abutting engagement with the free end portion of the lower arm 35. A resilient bar or leaf spring 46 is bolted or otherwise rigidly secured at its upper end to the intermediate portion of the upper arm 34, and has its lower end portion engaging one face of the lower arm 35 to yieldingly urge said lower arm 35 in a direction of angular movement to cause abutting engagement between the free end portion thereof and the adjustment screw 45. The free end portion of the upper arm 34 derives some support from a second counter-balancing spring 46' which encompasses an elongated guide rod 47 which extends loosely through an opening in a supporting plate 48 welded or otherwise rigidly secured to the free end of the lower arm 35, said thrust plate 48 supporting the lower end of the spring 46'. With reference particularly to Fig. 6, it will be seen that the upper end of the guide rod 47 is provided with an enlarged head 49 against the lower end of which the upper end of the spring 46' abuts, the head 49 being pivotally connected to a lug 50 that is welded or otherwise rigidly secured to the upper end portion of the leg 43. The lower arm 35, and with it the upper arm 34 and parts carried thereby, is yieldingly urged in a direction of its swinging movement, toward the web 29 of the angular member 28, by a coil compression spring 51, see particularly Figs. 2 and 4. The spring 51 is interposed between the intermediate portion of the lower arm 35 and a washer 52 mounted on a guide bolt or the like 53 that is anchored at one end to the web 29, as indicated at 54, said bolt 53 extending loosely through an aperture 55 in the leg 35. A pair of nuts or burrs 56 are screw threaded on the outer end portion of the bolt 53 for adjusting the compressive force of the spring 51. With the above arrangement, it will be seen that the lower arm 35 is yieldingly urged in a direction generally toward the tire X by the spring 51, the upper arm 34 being yieldingly urged toward the tire X by the lower arm 35 through the leaf spring 46, the adjustment screw 45 limiting this movement of the arm 34 toward the tire X.

A buffing head 57 is rigidly mounted on the free end portion of the upper arm 34, and comprises, a housing 58, a vertically disposed shaft 59 journalled therein, and a plurality, as shown two, of axially spaced buffing wheels or rasps 60 and 61 rigidly mounted on the shaft 59 and projecting outwardly through an opening 62 in the housing 58. The housing 58 further defines an outlet 63 for connection to blower means, not shown, for disposal of material ground from the tire X by the buffing wheels 60 or 61. The lower end of the shaft 59 projects downwardly through the bottom of the housing 58 and has rigidly secured thereto a sprocket wheel 64 over which is entrained an endless link drive chain 65. The drive chain 65 is further entrained over a drive sprocket wheel 66 rigidly secured to the shaft 67 of a drive motor 68 that is rigidly mounted on the intermediate portion of the upper arm 34 through the medium of a mounting plate 69.

Releasably locked to the upper end of the shaft 22 is a horizontally disposed cam or template 70 having an edge portion the contour of which corresponds to the contour of the road-engaging crown and shoulder portions of a tire. A disc-like rotary follower 71 is mounted on a vertically disposed shaft 72 that is suitably journalled in a bearing boss 73 bolted or otherwise rigidly secured to the free end portion of the lower arm 35, said follower 71 engaging the contoured edge of the cam or template 70, and yieldingly urged into engagement therewith by the coil compression spring 51. The arrangement is such, that the follower 71 substantially underlies the buffing wheels 60 and 61. When oscillatory, or limited rotary movement in alternately opposite directions is imparted to the frame 24 about the axis of the pedestal or shaft 22, engagement of the cam or template 70 by the follower 71 will cause limited swinging movements to be imparted to the arms 34 and 35 about the axis of the supporting shaft 31 independently of the oscillatory movement of the frame 24, so that the buffing wheels 60 and 61 will be caused to move in a path corresponding to the contour of the template 70. It will be noted that, when the tire engaging portions of the buffing wheels 60 and 61 are in directly overlying relationship to the corresponding peripheral portion of the follower 71, the path followed by said portions of the buffing wheels will be identical to that followed by the follower 71, and the dimensions of the buffed portion of the tire X will correspond to the contour dimensions of the cam or template 70. However, when the adjustment screw 45 is rotated in a direction to advance the upper arm 34 with respect to the lower arm 35 in a direction toward the tire X, the path followed by the buffing wheels 60 and 61 will follow the same contour but have smaller contour dimensions than those of the template 70. Conversely, when the adjustment screw 45 is rotated to retract the buffing wheels 60 and 61 in a direction away from the tire X, the buffing wheels will follow a contour similar to that of the template 70 but of greater dimensions. Thus, tires of various cross sectional dimensions can be buffed with the use of a single template.

Through practice I have found that by having the buffing wheels rotate on an axis normal to the axis of the tire to be buffed, to produce cross buffing, I have been able to produce a smoother finish on the tire with a given buffing wheel than when the same buffing wheel is rotated on an axis parallel to the axis of the tire. The purpose of using a plurality of buffing wheels is two-fold. In some instances it may be desired that one of the buffing wheels 60 or 61 have an extremely coarse cutting or rasping surface for fast initial buffing while the other buffing wheel has a relatively fine buffing surface for finish buffing. In other instances it may be desired that both buffing wheels 60 and 61 have substantially identical rasping or buffing surfaces, so that when one of the buffing wheels has become unduly worn, the other thereof may be brought into use merely by changing the elevation of the upper arm 34 through the medium of the rack and pinion arrangement 38—39 controlled by the hand wheel 41. Fig. 6 shows the buffing wheel 60 in its operative position substantially at a level with the axis of the tire X, the buffing wheel 61 being downwardly spaced therefrom. When it is desired to utilize the buffing wheel 61, it is only necessary that the operator rotate the handwheel 41 in a direction to raise the upper arm 34 sufficiently to bring the buffing wheel 61 to the level of the axis of the tire X.

For the purpose of imparting automatic oscillatory movements to the frame 24 and parts carried thereby, I provide power operated mechanism now to be described. An electric motor 74 is rigidly mounted on the extension portion 13 of the slide 12, and is provided with a drive shaft 75 on which is rigidly mounted a sprocket wheel 76. An endless link chain 77 is entrained over the sprocket wheel 76 and another sprocket wheel 78 fast on a screw thread equipped shaft 79 that is journalled at its opposite ends in bearing brackets 80 and 81. Screw threadedly received on the shaft 79 is a traveling nut 82 to which is pivotally secured at one end a pitman arm 83. The opposite end of the pitman arm 83 is pivotally secured, as indicated at 84, to a crank acting arm 85 which projects laterally outwardly from the adjacent side of the frame member 25. A control rod 86 is operatively coupled to the pitman arm 83 at one end, and at its other end portion is mounted for longitudinal sliding movements in the bearing bracket 80, the control rod 86 carrying a pair of longitudinally spaced control switches 87. The switches are adapted to engage different ones of a pair of switch actuators 88, each of which is mounted on the opposite hand of a reverse threaded screw 89 that is journalled at its opposite ends in the brackets 80 and 81. A handle equipped crank 90 is rigidly secured to a projecting end of the screw 89 adjacent the bracket 80, whereby the screw 89 may be rotated to move the switch actuators 88 toward or away from each other to vary the limits of oscillatory movement imparted to the frame 24 and parts carried thereby by the reversible motor 74, screw shaft 79, traveling nut 82 and pitman arm 83. The switches 87 are of a type in common use for causing reversal of the direction of rotation of a motor.

It is believed that the operation of the instant buffing machine is obvious from the foregoing description. To accommodate tires of varying diameters, it is only necessary that the slide 12 be moved in the desired direction through manipulation of the hand wheel 21. As above described, adjustment for tires of various cross-sectional dimensions is made through the adjustment screw 45.

While I have shown and described a commercial embodiment of my improved tire buffing machine, it will be understood that the same is capable of modification, and that modification may be made without departure from the spirit and scope of the invention, as defined in the claims.

What I claim is:

1. In a tire buffing machine, a base, rotary means mounted on said base for supporting a tire for rotation on its own axis, a slide mounted on said base for movement in opposite directions transversely with respect to the axis of said tire supporting means, a frame mounted on said slide for common movements therewith and for rotation on an axis normal to the direction of movement of said slide and to the axis of rotation of said tire supporting means, a pair of arms each independently mounted at one end on said frame for swinging movements on a common axis parallel to the axis of rotation of said frame and generally toward and away from the axis of said tire supporting means, means connecting said arms together for common swinging movements permitting limited angular movement of one of said arms relative to the other thereof about the axis of swinging movement thereof, means for adjusting the angular relationship between said arms about said last-mentioned axis, a template fixedly mounted on said slide, tire-buffing mechanism including a rotary buffing wheel carried by one of said arms, a template follower carried by the other of said arms and engaging said template, and yielding means urging said other one of the arms in a direction of swinging movement whereby the follower engages said template, said buffing wheel being moved in a path corresponding to the contour of said template responsive to rotation of said frame.

2. In a tire buffing machine, a base, rotary means mounted on said base for supporting a tire for rotation on a horiontal azis, a slide mounted on said base for horizontal sliding movements in opposite directions transversely of the direction of the axis of said tire supporting means and horizontally below a tire casing mounted on said tire supporting means, a frame mounted on said slide for common movements therewith and for rotation on a vertical axis, a pair of vertically spaced arms each pivotally independently mounted at one end on said frame for swinging movements on a common vertical axis spaced from the axis of swinging movement of said frame in a direction generally parallel to the axis of said tire supporting means, means connecting said arms together for common swinging movements but permitting limited angular movement of one of said arms relative to the other thereof about the axis of swinging movements thereof, means for adjusting the angular relationship between said arms about said last-mentioned axis, a template fixedly mounted on said slide, tire buffing mechanism including a buffing wheel carried by one of said arms for rotation on a vertical axis, a follower carried by the other of said arms and engaging said template, and yielding means urging said other one of the arms in a direction of its swinging movement whereby said follower engages said template, said buffing wheel being moved in a path corresponding to the contour of said template responsive to rotation of said frame.

3. In a tire buffing machine, a base, rotary means mounted on said base for supporting a tire for rotation on a horizontal axis, a slide mounted on said base for horizontal sliding movements in opposite directions transversely of the direction of the axis of the tire supporting means and horizontally below a tire casing mounted on said tire supporting means, a frame mounted on said slide for common movements therewith and for rotation on a vertical axis, a pair of vertically spaced arms each pivotally independently mounted at one end on said frame for swinging movements on a common vertical axis spaced from the axis of swinging movement of said frame in a direction generally parallel to the axis of said tire supporting means, means connecting said arms together for common swinging movements but permitting limited angular movement of one of said arms relative to the other thereof about the axis of swinging movements thereof, means for adjusting the angular relationship between said arms about said last-mentioned axis, means for moving the upper one of said arms vertically relative to the lower one of said arms, a power driven rotary shaft journalled at the free end portion of said upper arm on a vertical axis, a pair of vertically spaced buffing wheels secured to said shaft for selective engagement with the road engaging crown and shoulder portions of a tire mounted on said tire supporting means responsive to raising and lowering movements of said upper arm, a template fixedly mounted on said slide, a follower carried by said lower arm, and yielding means urging said lower arm in a direction of its swinging movement whereby said follower engages said template, said buffing wheels being moved in a path corresponding to the contour of said template responsive to rotation of said frame.

4. The structure defined in claim 3 in which said means connecting said arms together for common swinging movements comprises an elongated resilient bar element secured to one of said arms and bearing against the other of said arms in a direction to urge said upper arm and buffing wheel toward engagement with a tire on said tire supporting means, said means for adjusting the angular relationship between said arms comprising an adjustment screw carried by one of said arms and engaging the other of said arms under bias exerted by said resilient bar.

5. The structure defined in claim 3 in further combination with means for imparting limited oscillatory movement to said frame about the axis of rotation thereof, said means comprising a reversible electric motor mounted on said slide, a screw device operated by said motor, and a pitman arm connected to said screw device and to said frame radially outwardly of the axis of rotation of said frame.

References Cited in the file of this patent
UNITED STATES PATENTS

| | | |
|---|---|---|
| 2,130,627 | Kelly | Sept. 20, 1938 |
| 2,787,089 | Hawkinson | Apr. 2, 1957 |
| 2,864,445 | Hawkinson | Dec. 16, 1958 |